Figure 1:
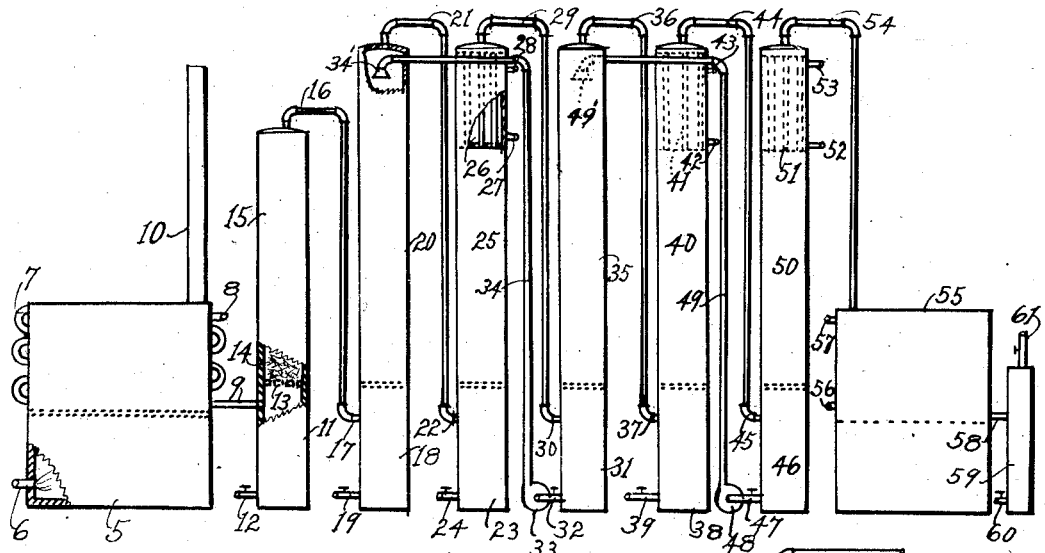

April 24, 1928.

C. M. ALEXANDER 1,667,340

PROCESS OF FRACTIONATING OILS

Filed Jan. 12, 1926

Clive M. Alexander, Inventor

By his Attorneys
Gifford & Scull

Patented Apr. 24, 1928.

1,667,340

UNITED STATES PATENT OFFICE.

CLIVE M. ALEXANDER, OF TULSA, OKLAHOMA.

PROCESS OF FRACTIONATING OILS.

Application filed January 12, 1926. Serial No. 80,691.

This invention relates to a process of fractionating oils. It relates more particularly to a method of separating or fractionating hydrocarbon or petroleum oil mixtures into less complex mixtures through distillation. The portion of the distillation phase, which is involved in the method of fractionation, is that which lies between the primary vaporization and the final condensation. It consists of a system in which partial condensates or refluxes are transferred, so that the reflux is countercurrent in flow to that of the vapors being fractionated, and so that the reflux is contacted in a countercurrent direction with the vapors being treated.

Heretofore, the fractionation of petroleum hydrocarbons from crude petroleum, which is a very important phase of the industry, has been accomplished through fractional vaporization and liquefaction, and treatment of the vapors by partial condensation or refluxing, with or without steam. Improvements have been effected by having towers intermediate the stills and condensers and effecting fractionation of the vapors in the towers. The fractionation in the towers was a result of partial condensation by atmospheric or controlled cooling, and the partial condensate or reflux was contacted with the vapors through countercurrent flow over baffles within the tower. The reflux was trapped back to the still or vaporizing vessel from the bottom of the tower. These towers generally depended for their condensing action on condensation by the atmosphere which resulted in variable fractionation, better fractionation being obtained under those conditions of the atmosphere which produced the most condensation of vapors within the tower. It has been found that the amount of condensate or reflux can be controlled through the use of water or oil cooled dephlegmators, and more positive fractionation thereby results. The dephlegmators are placed above the rectifying column in which the liquid reflux and vapors are brought into contact with each other. The pumping of heavy oils, such as fresh oil to be charged to the still through the towers has also been practiced. Improvements have been made in petroleum refining practice by controlling the quantity of reflux and by more efficient contacting of the vapors and reflux. However, the quality of reflux has not been correctly regulated and applied, and this constitutes a very important factor in efficient fractionation of hydrocarbon oils.

In my invention vapors from hydrocarbon mixtures are also fractionated through partial condensation and through contacting in countercurrent flow with partial condensates or refluxes. These partial condensates or refluxes are of similar hydrocarbon composition to that of the vapors being treated, but differ in their vapor tensions and boiling ranges. Such partial condensates or refluxes constitute condensates intermediate to the vapors being treated. They have vapor tensions below those of the vapors being treated, and they have boiling ranges intermediate those of the vapors being treated. More specifically, the refluxes or partial condensates have initial boiling points higher and end boiling points lower than the vapors with which they are being contacted to produce fractionation.

My process is one by which complex mixtures of hydrocarbon or petroleum oils are fractionated into less complex mixtures through countercurrent contacting of vapors therefrom, while both the quantity and specific quality of the liquid condensates or refluxes that contact with the vapors are controlled. In carrying out my process, the hydrocarbons that are to be fractionated are introduced into a vaporizing vessel, which may, for example, be a coil of pipe in a furnace, and that portion of the mixture desired is vaporized therein. The vapors from the still may be passed through filming or bubbling towers, in which the vapors are contacted with partial condensates or refluxes of the hydrocarbon mixture.

When a pipe still is operated with a series of towers and condensers, in accordance with my invention, the specific partial condensates or refluxes that are obtained consist of condensates intermediate to fractionated condensates, and are the result of reflux rectification. In such a system there are several fractionated condensates and intermediate refluxes. These intermediate refluxes are partial condensates of the vapors being fractionated, and are transferred in a direction countercurrent to the vapors to towers or zones alternating with towers or zones from which fractionated condensates are obtained. Such countercurrent transfer of reflux intermediates without withdrawal from the system is adiabatic in rectification and results in efficient fractionation.

In the accompanying drawings are illustrated somewhat diagrammatically arrangements of apparatus by which my process can be carried out. In the drawings, Fig. 1 is a side view of an arrangement of apparatus shown somewhat diagrammatically, and Fig. 2 is a similar view of a different arrangement of apparatus by the use of which my process may be practiced.

In Fig. 1 of the drawings reference character 5 indicates a furnace that may be heated, for example, by means of the oil or gas burner 6, and is located beneath the still in which the pipes 7 are located, so that the hydrocarbon oil to be distilled can be introduced through the inlet 8 and pass out through the outlet 9, the waste hot products of combustion passing out through the stack 10. The exit pipe 9 leads to the lower end 11 of a tower provided with a valved outlet pipe 12. A grating 13 is located in the tower above the pipe 9, and granular or porous material 14 is located in the upper portion of the tower to distribute the vapors and cause intimate contact between the vapors and liquid that is passed downwardly in countercurrent direction in the portion 15. An outlet pipe 16 leads from this tower to the lower portion 18 of the next tower, entering the same as shown at 17. This tower is likewise provided with a valved outlet pipe 19, and a grating and portion 20 with filming or distributing material. The pipe 21 leads from the upper portion of this tower to the next tower at 22, which has a lower portion 23 provided with a valved outlet pipe 24 and an upper portion 25 above a grating likewise filled with distributing material. The upper portion of this tower is provided with a partial condenser or dephlegmator 26, into which cooling fluid is introduced at 27, and is withdrawn at 28. A pipe 29 leads from the top of this tower to the space 31 of the next tower, as shown at 30. The lower portion of this space 31 is provided with a valved pipe 32 that leads to a pump 33, from the outlet of which a pipe 34 leads to the sprayer 34' located near the top of the space 20 of a preceding tower. A grating is provided above the space 31, and the portion 35 is likewise provided with distributing material to cause intermediate contact of vapors and condensate that are flowing in countercurrent direction. An outlet pipe 36 leads from the top of this tower to the portion 38 of the next tower, as shown at 37, this tower being provided at the lower part with an outlet pipe 39, and also with a portion 40 that has distributing material therein, as well as a partial condenser 41 with inlet pipe 42 and outlet pipe 43 for cooling fluid. A pipe 44 leads from the top of this tower to the space 46 of the next tower, as shown at 45. A valved pipe 47 leads from the lower portion of the space 46 to the pump 48, from the outlet of which a pipe 49 leads to a sprayer 49', located near the top of the space 35 of a preceding tower. The portion of the tower 50 above the grating is filled with contacting material, and is also provided at its upper end with a partial condenser 51, having pipes 52 and 53 for inlet and outlet of the cooling fluid. A pipe 54 leads from the top of this tower to the condenser 55 that is provided with an inlet 56 and outlet 57 for cooling fluid. A pipe 58 leads the condensate from this condenser to the receptacle 59, at the lower end of which is provided a valved outlet pipe 60 for the liquid, and at the upper portion a valved outlet 61 for the uncondensed gases.

The operation is as follows: The oil to be distilled is introduced at 8 and passes through the coil 7 in the still where it is heated, and the mixed vapors and oil pass through the outlet 9 into the lower portion of the separating tower where liquid settles to the bottom and is drawn off through the pipe 12, while the vapors pass upwardly and over the surfaces of the distributing material 14, and finally through the pipe 16 into the next tower. It then passes upwardly over the contacting material in the portion 20, and is contacted by and rectified by the liquid that passes downwardly in countercurrent flow from the sprayer 34'. The condensate passes to the bottom of this tower and is withdrawn through the valved pipe 19 as a gas oil. The vapors pass through the pipe 21 into the bottom portion of the next tower, thence upwardly through the contacting material, meeting partial condensate flowing downwardly from the partial condenser 26. The condensate from this tower is withdrawn through the pipe 24 and is of a lower boiling point than that drawn from the pipe 19. Uncondensed vapors pass through the pipe 29 into the next tower, thence upwardly over the surfaces of the contacting material in the portion 35, where it meets downcoming condensate that is sprayed in the top of this tower by means of the sprayer 49'. The condensate settling to the lower portion of this tower is of a lower boiling point than that which passes out of the pipe 24. It is withdrawn through the valved pipe 32 and pumped by means of the pump 33 into the sprayer 34'. The vapors above the sprayer 49' pass through the pipe 36 into the next tower, where the vapors pass upwardly and meet downflowing partial condensate from the partial condenser 41, the light oil or naphtha being withdrawn through the pipe 39, and the uncondensed vapors pass through the pipe 44 into the next tower, from which partial condensate intermediate the condensate passing out of the pipe 39 and the final condensate passes through the valved pipe 47 and is pumped by means of the pump 48 into the sprayer 49'. The vapors pass through the pipe 54 into the final condenser 55, from which the gasoline is collected in the collector 59, and may be withdrawn from time to time from the discharge pipe 60, the gases passing out through the pipe 61, as already described.

Figure 2:
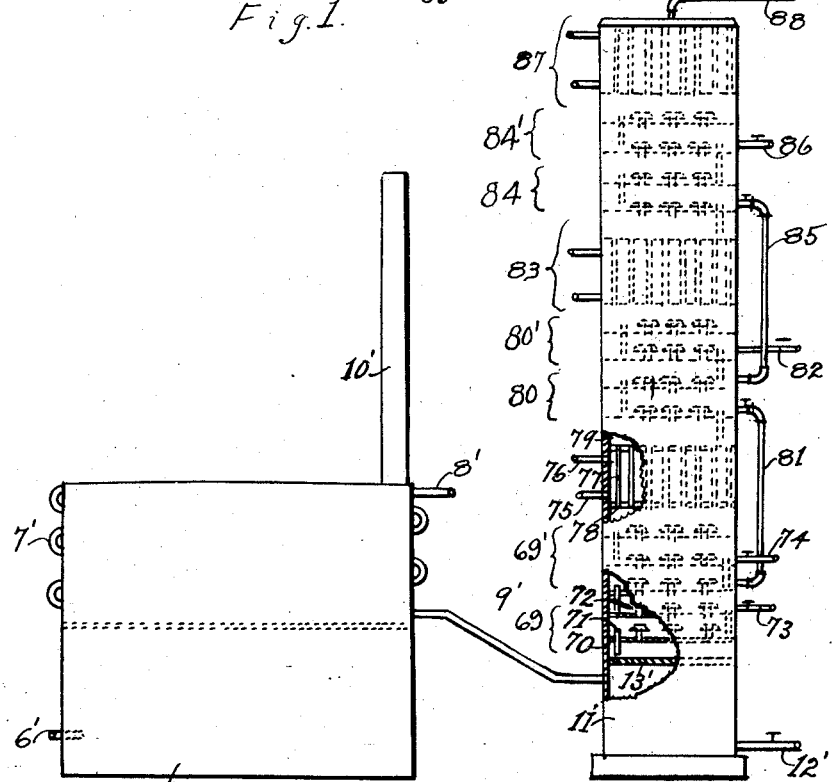

In Fig 2 the furnace 5' is heated by the heaters 6', and the hot products of combustion therefrom heat the coil 7' and pass out through the stack 10'. The oil to be distilled is introduced at 8', and after being heated, passes through the pipe 9' into the portion 11' at the bottom of the column where the vapors and liquid separate, the heavy liquid being withdrawn through the valved pipe 12' and the vapors passing upwardly and through a series of rectifier zones 69 and 69', that may be made up of trays 70, having the liquid return pipe 71 and the vapor bubbling caps 72 of the well-known type. The vapors pass upwardly and are rectified by contact with returning partial condensates or refluxes. An outlet pipe 73 is provided on the lower tray of the adiabatic rectifier zone for withdrawing heavy oil, and an outlet pipe 74 is located higher on the lower tray of another rectifier zone from which somewhat lighter oils may be withdrawn. After the vapors pass through a number of rectifier trays or sections, they pass through a condenser that may consist of tubes 77 located in plates 78 and 79, that are cooled by cooling fluid that enters through the pipe 75 and passes outward through the pipe 76, such a partial condenser being termed a dephlegmator. The vapors from this partial condenser or dephlegmator pass upwardly through two rectifying zones, 80 and 80', each consisting of several trays of bubbling caps or baffle sections similar to those already described. In the first rectifying zone 80 the vapors are fractionated by adiabatic contacting with reflux from a cooler adiabatic rectifier zone higher in column. A valved outlet pipe 81 leads from the bottom tray of this rectifying zone to a hotter rectifying zone lower in column for adiabatic reflux contacting with vapors which has an outlet pipe for reflux at 73. In the second rectifying zone 80', the vapors are fractionated by contacting with partial condensate from a dephlegmator zone 83, similar to one already described. The vapors therefrom pass through two other rectifier zones 84 and 84'; from the lower zone of which a valved pipe 85 leads to the upper tray of rectifier zone 80. An outlet pipe 86 is also provided on the lower tray of the rectifying zone 84', and another partial condenser, which serves as a final condenser, is located in the space 87 at the top of the column, and the uncondensable gases pass out through the pipe 88. Rectifier zones 69, 80 and 84 are similar in operation in that fractionation is effected through contacting of vapors with reflux transferred from a cooler rectifying zone between which zones there has been withdrawn a rectified partial condensate from the vapors. Rectifier zones 69', 80' and 84' are similar in operation in that fractionation is effected through contacting of vapors with a partial condensate produced through cooling in dephlegmators immediately following. In the customary procedure of operation the products withdrawn as fractionated condensates at 12', 73, 74, 82, 86 and 88 are respectively fuel oil, gas oil, kerosene, naphtha, gasoline, and incondensable gas.

In carrying out this process, the operation is continuous and fractionation of the product is obtained in a very thorough and efficient manner. The operation of the process is similar with both arrangements of apparatus above described, with respect to the quality and flow of the refluxes or partial condensates. In both cases a reflux of composition intermediate the vapors being contacted is transferred to alternate zones. A fractionated condensate is withdrawn prior to each zone of reflux contacting and intermediate to the reflux rectification zones or adiabatic vapor liquid interchange zones. They differ, however, in the method of refluxing, in that with the arrangement of apparatus shown in Figure 1, positive pump transfer of reflux is used, while in the arrangement shown in Figure 2, gravity transfer of reflux is used, thus making the apparatus shown in Figure 1 somewhat more flexible in operation.

In this process of fractionation, a high degree of fractionation is attained through contacting of partial condensates or refluxes of lower vapor tensions and intermediate boiling ranges with vapors of higher vapor tensions and wider boiling ranges, and higher fractionated condensates are thereby obtained continuously. The efficient fractionating may be accompanied by heat economy by using the oil to be distilled as the cooling fluid for the partial condensers, thereby heating the same before it is introduced into the pipe still. Reboilers or heat exchangers may also be advantageously used for treating the condensates, while, at the same time, employing the other features of this invention.

The following is given as a specific example of carrying out the process, showing how the apparatus used in Fig. 1, for example, may be utilized. A 39° Bé. gravity crude oil is charged to the pipe still 7 and heated to a temperature of about 700° to 800° F., and is discharged into the separator tower 11 where the vapor and liquid are separated. The liquid leaving at pipe 21 is a fuel oil of about 16° to 20° Bé. gravity. The first rectification and condensation is effected in the space 20 of the next tower by means of the reflux that is sprayed in at 34'. The condensate from the lower portion of this tower that leaves through the pipe 19 is a gas oil fraction of about 32 to 36° Bé. A kerosene fraction of about 41 to 43° Bé. gravity is obtained from the pipe 24 of the corresponding tower, having been fractionated by dephlegmation and rectification. This fraction has an initial boiling point of about 430° F., and an end boiling point of about 500° F. The next fraction or naphtha which has a gravity of about 46 to 50° Bé. is obtained from the pipe 39 of the corresponding tower through dephlegmation and rectification. It has an initial boiling point of about 320° F., and an end boiling point of about 430° F. The light gasoline fraction of about 62 to 64° Bé. gravity is obtained from the final condenser 55, and has an initial boiling point of about 100° F., and an end boiling point of about 350° F. This fraction when blended with the naphtha fraction from the pipe 39 makes a motor fuel of about 57 to 59° Bé. gravity, with an end boiling point of about 415° F. A fraction is withdrawn by the pump 48 through the pipe 47 from the corresponding tower, which fraction is obtained by dephlegmation or refluxing, and is intermediate the gasoline fraction from pipe 60 and the naphtha fraction from pipe 39. It has a gravity of about 54 to 56° Bé. with an initial boiling point of about 220° F., and an end boiling point of about 390° F. It is sprayed through the sprayer 49' where it contacts with a vapor that has an initial boiling point of about 100° F. and an end boiling point of about 430° F. The reflux from this tower which passes out through the pipe 32 is intermediate the naphtha fraction from the pipe 39 and the kerosene fraction from the pipe 24. It has a gravity of about 44 to 46° Bé., with an initial boiling point of about 350° F., and an end boiling point of about 460° F. It is passed by means of the pump 33 through the sprayer 34' into contact with vapor that has an initial boiling point of about 100° F., and an end boiling point of about 500° F.

It will thus be seen that by this invention, a composite vapor is distilled off from hydrocarbons in a continuous system, and the vapor is separated into several fractionated condensates through rectification. This fractionating through rectification is accomplished by contacting the vapors from the hydrocarbons in consecutive zones with a progressive common reflux transfer and a consecutive condensation of vapor fractions occurs between these rectification or contacting zones.

I claim:—

1. The process which comprises distilling oil and passing the vapors therefrom through a series of partial condensers, contacting the condensates from said condensers countercurrent with said vapors in stages, some of said condensates being contacted with vapors in stages twice removed from the stages where they are produced.

2. The process which comprises distilling oil, condensing vapors therefrom, contacting vapors countercurrent with said condensate at a plurality of places, condensing vapors and withdrawing condensate from the system intermediate said contactings with said first named condensate.

3. The process which comprises distilling oil, contacting vapors therefrom with reflux condensate, and condensing vapors and withdrawing condensate at a stage in the system subsequent to said contacting and prior to the stage where said reflux is formed.

4. The process which comprises distilling oil, contacting vapors therefrom with reflux condensate, and condensing vapors and withdrawing condensate at a stage in the system subsequent to said contacting and prior to the stage where said reflux is formed, and repeating said operation in sequence with the vapors passing off of said distillation.

5. The process which comprises distilling oil, contacting vapors therefrom with reflux condensate from said vapors having a lower final boiling point than the highest boiling constituent of said vapors that are being contacted, and subsequently contacting the vapors with a higher boiling condensate.

6. The process which comprises distilling oil, condensing vapors therefrom in a plurality of stages each cooler than the preceding, contacting vapors countercurrent with condensates so formed, one of said condensates contacting with hotter vapors than the vapors contacted by a hotter condensate.

7. The process which comprises distilling oil, condensing vapors therefrom in a plurality of stages each cooler than the preceding, contacting vapors countercurrent with condensates so formed, one of said condensates contacting with hotter vapors than the vapors contacted by a hotter condensate, and withdrawing liquid from the system at a zone between the two.

CLIVE M. ALEXANDER.